(12) United States Patent
Nakai et al.

(10) Patent No.: US 7,950,416 B2
(45) Date of Patent: May 31, 2011

(54) SOLENOID VALVE

(75) Inventors: Masaya Nakai, Anjo (JP); Takahiro Kokubu, Anjo (JP)

(73) Assignee: Aisin Aw Co., Ltd., Aichi-ken (JP)

( * ) Notice: Subject to any disclaimer, the term of this patent is extended or adjusted under 35 U.S.C. 154(b) by 577 days.

(21) Appl. No.: 12/056,510

(22) Filed: Mar. 27, 2008

(65) Prior Publication Data
US 2008/0308757 A1 Dec. 18, 2008

(30) Foreign Application Priority Data

Jun. 18, 2007 (JP) ................................. 2007-159932

(51) Int. Cl.
*F15B 13/044* (2006.01)

(52) U.S. Cl. .............................. 137/625.69; 137/625.65

(58) Field of Classification Search ............. 137/625.65, 137/625.69; 251/282
See application file for complete search history.

(56) References Cited

U.S. PATENT DOCUMENTS

| | | | | |
|---|---|---|---|---|
| 2,952,275 A * | 9/1960 | Mock | ........................ | 137/625.69 |
| 4,126,155 A * | 11/1978 | Bertram | .................... | 137/625.69 |
| 4,245,816 A * | 1/1981 | Johnson | ........................ | 251/282 |
| 4,615,358 A * | 10/1986 | Hammond et al. | ....... | 137/625.65 |
| 4,862,920 A * | 9/1989 | Cleasby | .................... | 137/625.69 |
| 4,899,785 A * | 2/1990 | Inokuchi | .................. | 137/625.65 |
| 5,014,747 A * | 5/1991 | Suzuki et al. | ............. | 137/625.65 |
| 5,682,744 A * | 11/1997 | Hasegawa et al. | ....... | 137/625.69 |
| 6,220,288 B1 | 4/2001 | Sandau et al. | | |
| 6,397,890 B1 * | 6/2002 | Mickelson et al. | ...... | 137/625.69 |
| 6,450,194 B1 * | 9/2002 | Wasson et al. | ........... | 137/625.69 |
| 6,739,293 B2 * | 5/2004 | Turner et al. | ............. | 137/625.65 |
| 7,604,022 B2 * | 10/2009 | Kim | .......................... | 137/625.69 |
| 2002/0079002 A1 | 6/2002 | Ueki | | |
| 2007/0057217 A1 | 3/2007 | Kamidate et al. | | |
| 2007/0193639 A1* | 8/2007 | Ling et al. | ................ | 137/625.65 |

FOREIGN PATENT DOCUMENTS

| | | |
|---|---|---|
| CN | 1932354 A | 3/2007 |
| JP | 5-036179 U | 5/1993 |
| JP | 2002-130494 A | 5/2002 |
| JP | 2004-176895 A | 6/2004 |

* cited by examiner

*Primary Examiner* — John Rivell
(74) *Attorney, Agent, or Firm* — Sughrue Mion, PLLC (57) ABSTRACT

In a solenoid valve including a cylindrical sleeve which is formed with an input port, an output port, a drain port and a feedback port, and a spool which is inserted into the sleeve and which is formed with a plurality of lands for closing the individual ports, and a communication portion for communicating the individual ports; an input notch is formed in an end edge of the land located near the input port, while a drain notch is formed in an end edge of the land located near the drain port, and an axial height Hin of the input notch and an axial height Hdr of the drain notch are set so that the proportion $\alpha$ (=Hin/(Hin+Hdr)) of the height Hin to the sum of the heights Hin and Hdr may fall within a range of at least 0.72 (preferably, 0.85) and less than 1.0.

12 Claims, 7 Drawing Sheets

SOLENOID VALVE

CROSS-REFERENCE TO RELATED PATENT APPLICATION

This application claims priority from Japan Patent Application No. 2007-159932, filed on Jun. 18, 2007, the disclosure of which is incorporated herein in its entirety by reference.

BACKGROUND OF THE INVENTION

1. Field of the Invention

The present invention relates to a solenoid valve, and more particularly to a solenoid valve including a sleeve which has an internal space that is formed with an input port, an output port and a drain port, a spool which is an axial member inserted into the internal space and which is capable of the communications and cuts-off among the individual ports, through the axial movements thereof, and a solenoid portion which axially moves the spool.

2. Description of Related Art

Heretofore, as a solenoid valve of this sort, there has been proposed one including a sleeve which has a cylindrical valve chest that is formed with an input port, an output port, a drain port and a feedback port as several sorts of ports allowing an oil to flow in and out, a spool which is an axial member inserted into the valve chest and which has a plurality of cylindrical lands each having an outside diameter substantially equal to an inside diameter of the valve chest, and a cylindrical communication portion having an outside diameter smaller than an outside diameter of each land and communicating the individual ports, and a solenoid which axially moves the spool (refer to, for example, JP-A-2004-176895 (Patent Document 1)). In this solenoid valve, notches are formed in the end edges of the lands, and it is described that part of the working oil inputted from the input port is drained from the drain port through the notches, whereby the pressure fluctuation of the working oil can be suppressed.

With the above solenoid valve, the working oil is drained from the drain port through the notches, whereby the pressure fluctuation of the working oil is suppressed from becoming excessive, and a smooth pressure regulation control can be realized, but a flow rate which is outputted from the output port decreases in correspondence with the drainage, and an output pressure lowers. For attaining a required output oil pressure, therefore, it becomes necessary, for example, to raise the r.p.m. of a pump which pressure-feeds the working oil, and energy consumption increases.

SUMMARY OF THE INVENTION

The solenoid valve of the present invention has for its principal object to suppress the lowering of an output pressure without increasing energy consumption, while realizing a smooth pressure regulation control.

The solenoid valve of the present invention has adopted the following means in order to accomplish the above principal object:

The solenoid valve of the present invention:
includes a sleeve which has an internal space that is formed with an input port, an output port and a drain port, a spool which is an axial member that is inserted in the internal space and which provides communications and cut offs among the individual ports, due to axial movement of the spool, and a solenoid portion which axially moves the spool;

wherein an input notch is formed in one of the sleeve and the spool so that a working oil flows into the input port through the notch, while a drain notch is formed in one of the sleeve and the spool so that the working oil is drained from the drain port through the notch; and the input notch and the drain notch are formed so as to satisfy $0.72 \leq Hin/(Hin+Hdr) < 1.0$ where Hin denotes an axial length of the input notch, and Hdr denotes an axial length of the drain notch.

In the solenoid valve of the present invention, the input notch is formed in one of the sleeve and the spool so that the working oil flow into the input port through the notch, while the drain notch is formed in one of the sleeve and the spool so that the working oil is drained from the drain port through the notch; and the input notch and the drain notch are formed so as to satisfy $0.72 \leq Hin/(Hin+Hdr) < 1.0$ where Hin denotes the axial length of the input notch, and Hdr denotes the axial length of the drain notch. Accordingly, a smooth pressure regulation control is realized by forming the input notch and the drain notch, and the quantity of the working oil which flows out from the drain port through the drain notch can be decreased to efficiently output the inputted working oil. As a result, the necessary output of the working oil can be ensured without enlarging energy required for driving an oil pressure generation source.

In such a solenoid valve of the present invention, the input notch and the drain notch can also be formed so as to satisfy $0.85 \leq Hin/(Hin+Hdr) < 1.0$. Thus, the quantity of the working oil which flows out from the drain port through the drain notch can be decreased to the utmost within the range of a manufacturing tolerance, and the advantages of the present invention can be made more remarkable.

Besides, in the solenoid valve of the present invention, the solenoid valve can be configured as a valve to which a line pressure regulated by a regulator valve is inputted through the input port, which regulates the inputted line pressure, and which directly outputs an oil pressure through the output port to a clutch or a brake incorporated in an automatic transmission operated by being supplied with the oil pressure. In a solenoid valve as in the related art, a line pressure is decreased to a constant pressure, a modulator pressure is inputted and regulated, and the regulated pressure is outputted, whereas in the solenoid valve of the present invention, the input pressure is the line pressure and is therefore a very high pressure. Accordingly, the quantity of the working oil which flows out from the drain port on the occasion of the pressure regulation becomes large, that is, necessary energy becomes conspicuously large. In accordance with the solenoid valve of the present invention, however, the clutch or the brake can be quickly actuated without enlarging energy required for driving an oil pressure generation source.

Further, in the solenoid valve of the present invention, the input notch and/or the drain notch can be formed in an arcuate shape, and the input notch and/or the drain notch can also be formed in a V-shape. In the former case, the flow rate fluctuation of the working oil relative to the movement of the spool can be made comparatively large, and in the latter case, the flow rate fluctuation of the working oil relative to the movement of the spool can be made comparatively small.

DESCRIPTION OF EXEMPLARY EMBODIMENTS

Next, the present invention will be described in conjunction with exemplary embodiments.

Figure 1:
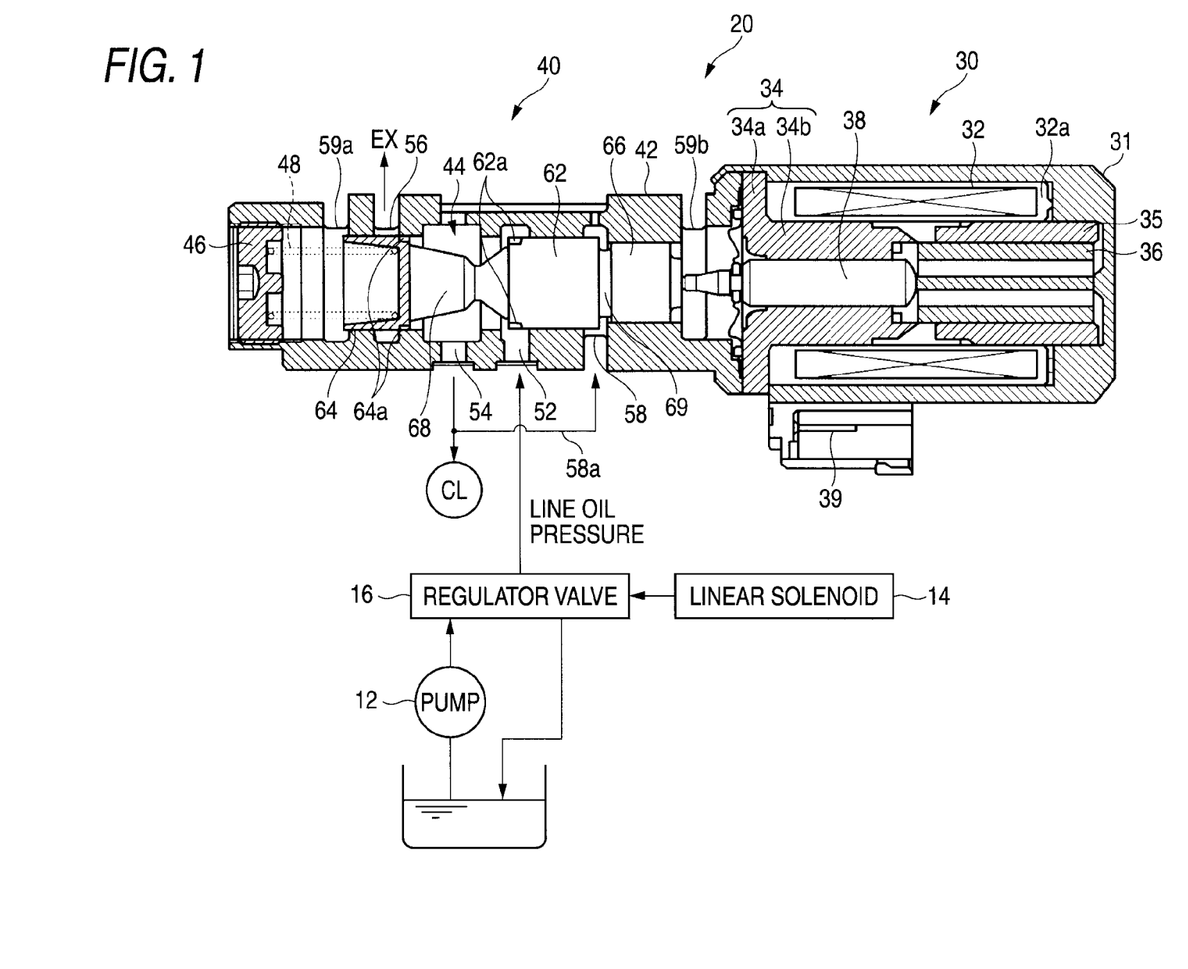
FIG. 1 is a configurational view showing the outline of the configuration of a solenoid valve 20 which is an exemplary embodiment of the present invention.

FIG. 1 is a configurational view showing the outline of the configuration of a solenoid valve 20 which is an embodiment of the present invention. The solenoid valve 20 of the embodiment is employed for, for example, the oil pressure control of a clutch which is incorporated in an automatic transmission, and it is configured as a linear solenoid valve for direct control, in which the optimum clutch pressure is generated from an oil pressure (line oil pressure) pressure-fed from an oil pump 12 and regulated by a regulator valve 16 with a linear solenoid 14, whereby the clutch CL is directly controllable. As shown in the figure, the solenoid valve 20 includes a solenoid portion 30, and a pressure regulation valve portion 40 which is driven by the solenoid portion 30 so as to input the line oil pressure thereto and to regulate and output the inputted line oil pressure.

The solenoid portion 30 includes a case 31 which is a bottomed cylinder member, a coil 32 which is arranged on the inner peripheral side of the case 31 and in which an insulated wire is wound around an insulating bobbin 32a, a first core 34 which is formed with a flange portion 34a with its flange outer peripheral part fixed to the open end part of the case 31, and a cylinder portion 34b extended in the axial direction of the solenoid valve along the inner peripheral surface of the coil 32 from the flange portion 34a, a cylindrical second core 35 which lies in touch with the inner peripheral surface of the case 31 and which is axially extended to a position spaced a predetermined interval from the cylinder portion 34b of the first core 34, along the inner peripheral surface of the coil 32, a plunger 36 which is inserted into the second core 35 and which is axially slidable on the inner peripheral surface of the second core 35 and the inner peripheral surface of the first core 34, and a shaft 38 which is inserted into the cylinder portion 34b of the first core 34, which abuts against the distal end of the plunger 36 and which is axially slidable on the inner peripheral surface of the cylinder portion 34b. Besides, the solenoid portion 30 is provided at its outer peripheral part with a terminal 39 which is electrically connected to the coil 32, and it can feed power to the coil 32 through the terminal 39.

The case 31, first core 34, second core 35 and plunger 36 are all formed of iron or the like ferromagnetic material of high purity, and the space between the end face of the cylinder portion 34b of the first core 34 and the end face of the second core 35 is formed so as to function as a nonmagnetic substance. Incidentally, since the space may function as the non-magnetic substance, a nonmagnetic metal such as stainless steel or brass may well be disposed.

In such a solenoid portion 30, when the coil 32 is energized through the terminal 39, a magnetic circuit in which magnetic fluxes flow round the coil 32 in the order of the case 31, second core 35, plunger 36, first core 34 and case 31 is formed, whereby an attractive force acts between the first core 34 and the plunger 36, and the plunger 36 is attracted. As stated before, the shaft 38 which is axially slidable on the inner peripheral surface of the first core 34 is held in abutment on the distal end of the plunger 36, so that the shaft 38 is pushed out frontward (leftward as viewed in the figure) due to the attraction of the plunger 36.

The pressure regulation valve portion 40 includes a substantially cylindrical sleeve 42 one end of which is mounted on the case 31 and first core 34 of the solenoid portion 30, a spool 44 which is inserted into the internal space of the sleeve 42 and one end of which is connected to the distal end of the shaft 38 of the solenoid portion 30, an end plate 46 which is screwed to the other end of the sleeve 42, and a coiled spring 48 which is retained between the end plate 46 and the other end of the spool 44 and which urges the spool 44 toward the side of the solenoid portion 30. Incidentally, the end plate 46 can finely adjust the urging force of the coiled spring 48 by adjusting the screw positions of this end plate.

As the openings of the internal space thereof, the sleeve 42 is formed with an input port 52 which is formed at substantially the central position of the sleeve 42 in the figure and into which the working oil pressure-fed from the oil pump 12 is inputted, an output port 54 which is formed at a somewhat left position in the figure and from which the working oil is discharged onto the side of the clutch CL, a drain port 56 (which is formed at the position of a left end in the figure) and from which the working oil is drained, and a feedback port 58 which is formed at a somewhat right position in the figure and into which the working oil discharged from the output port 54 is inputted through an oil passage 58a formed outside, so as to feed back the spool 44. Besides, exhaust apertures 59a and 59b which serve to exhaust the working oil having leaked out from between the inner peripheral surface of the sleeve 42 and the outer peripheral surface of the spool 44 due to the slide of the spool 44 are also formed in both the end parts of the sleeve 42.

The spool 44 is formed as an axial member which is inserted inside the sleeve 42, and as shown in the figure, it includes three cylindrical lands 62, 64 and 66 each of which has an outside diameter being substantially equal to the inside diameter of the sleeve 42, a communication portion 68 which connects the middle land 62 and left land 64 in the figure, which is formed in a tapered shape having an outside diameter that is smaller than the outside diameters of the lands 62 and 64 and that becomes smaller toward the middle part thereof from the two lands 62 and 64 and which is capable of the communications among the individual ports of the input port 52, output port 54 and drain port 56, and a connection portion 69 which connects the middle land 62 and right land 66 in the figure and which serves to feed back the spool 44.

Figure 2:
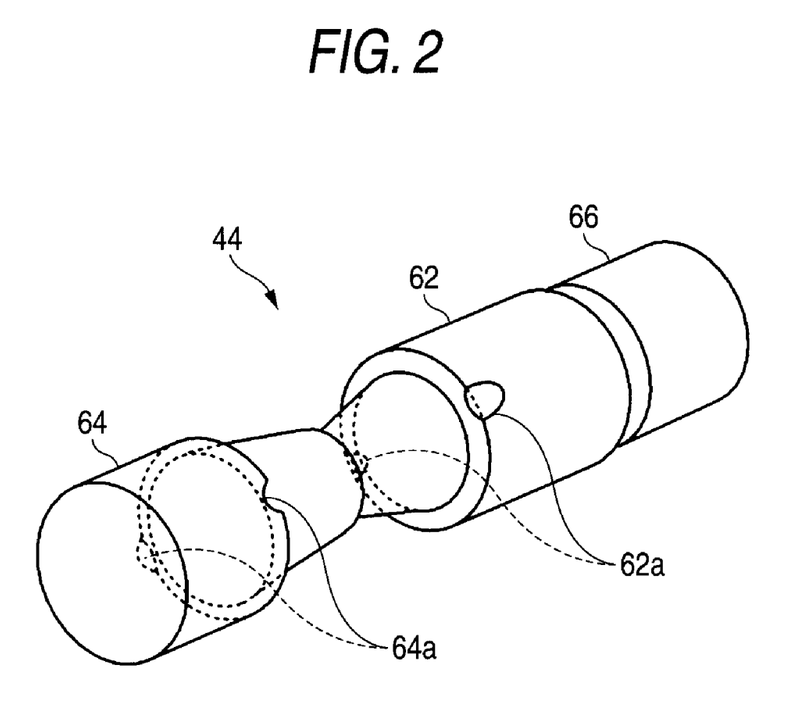
FIG. 2 is an exterior perspective view showing the exterior appearance of a spool 44.
Figure 3:
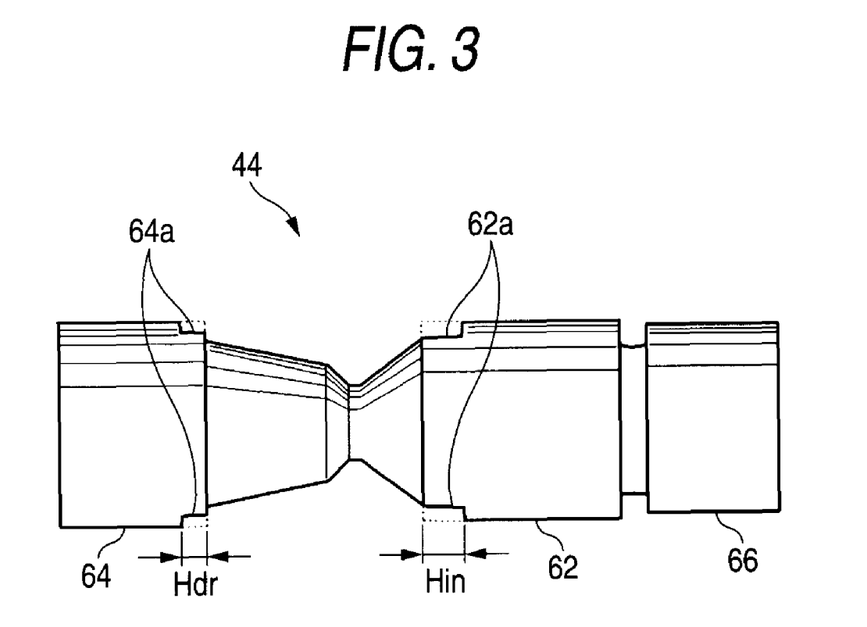
FIG. 3 is a front view with the spool 44 seen from the front thereof.

FIG. 2 is an exterior perspective view showing the exterior appearance of the spool 44, while FIG. 3 is a front view with the spool 44 seen from the front thereof. As shown in FIGS. 1 through 3, the land 62 which is located near the input port 52 is formed with arcuate notches (hereinafter, called "input notches 62a") in its end edge on the side of the communication portion 68 in such a manner that these notches are provided at an angular interval of 180 degrees about the axis of the spool 44, and that the axial height of the input notches 62a from the end face of the land 62 becomes "Hin" (refer to FIG.

3), while the land 64 which is located near the drain port 56 is formed with arcuate notches (hereinafter, called "drain notches 64a") in its end edge on the side of the communication portion 68 in such a manner that these notches similarly have an angular interval of 180 degrees about the axis of the spool 44, and that the axial height of the drain notches 64a from the end face of the land 64 becomes "Hdr" (refer to FIG. 3). Incidentally, the settings of the height Hin of the input notches 62a and the height Hdr of the drain notches 64a will be explained later.

The operation of the solenoid valve 20 of the embodiment thus configured will be described. Now, let's consider a case where the coil 32 is not energized. In this case, the spool 44 is moved onto the side of the solenoid portion 30 by the urging force of the coiled spring 48 (the state of FIG. 1), so that the input port 52 and the output port 54 are communicated by the communication portion 68, and the drain port 56 is communicated through the drain notches 64a. Accordingly, the working oil inputted into the input port 52 is outputted from the output port 54, while part of the working oil inputted into the input port 52 is drained from the drain port 56 through the drain notches 64a, and the oil pressure acting on the clutch CL rises. On the other hand, when the coil 32 is energized, the plunger 36 is attracted to the first core 34 by an attractive force which corresponds to the magnitude of a current applied to the coil 32, and consequently, the shaft 38 with the spool 44 connected to its distal end is pushed out frontward (leftward in FIG. 1), whereby the spool 44 is moved onto the side of the coiled spring 48. On this occasion, the spool 44 is stopped at a position at which the thrust (attractive force) of the plunger 36, the urging force of the coiled spring 48, and a feedback force exerted on the spool 44 by the pressure of the working oil inputted from the output port 54 into the feedback port 58 are balanced. As the spool 44 is moved more onto the side of the coiled spring 48, the open area of the input port 52 is made smaller, and the open area of the drain port 56 is made larger, and when the spool 44 has been moved most onto the side of the coiled spring 48, the input port 52 is completely closed by the land 62, and the output port 54 and the drain port 56 are communicated. Thus, the oil pressure acting on the clutch CL lowers. In this manner, the solenoid valve 20 of the embodiment holds the input port 52 and the output port 54 in communication when the coil 32 is not energized, and it is therefore understood that the solenoid valve 20 functions as a solenoid valve of normally-open type.

Figure 4:
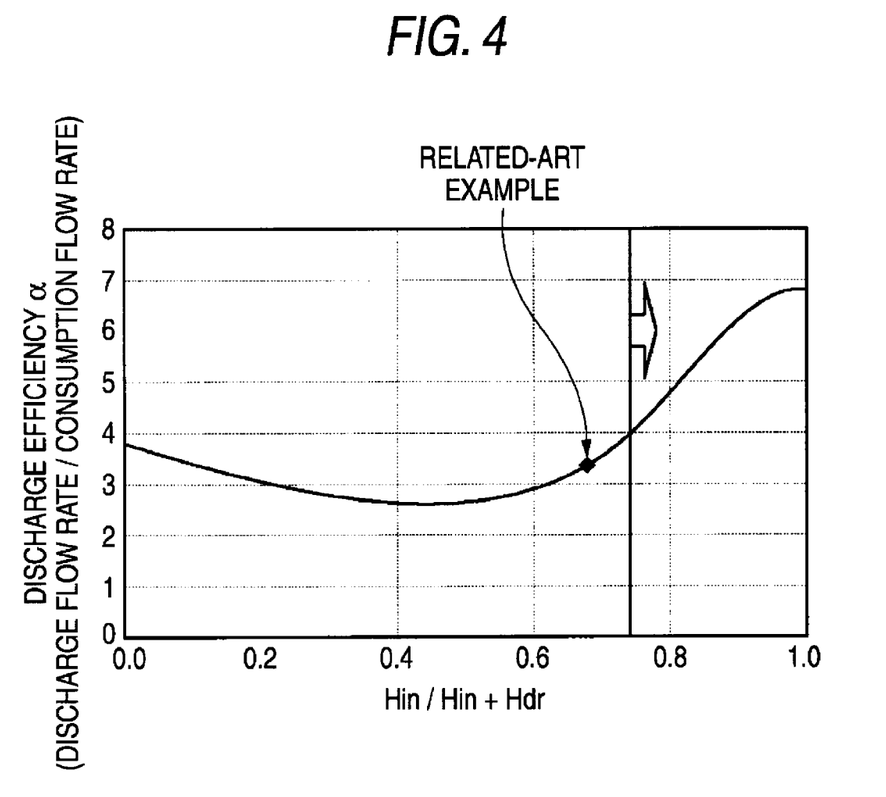
FIG. 4 is an explanatory diagram showing the relationship between the proportion Hin/(Hin+Hdr) of the height Hin of an input notch 62a to the sum of the height Hin of the input notch 62a and the height Hdr of a drain notch 64a and a discharge efficiency α which is the proportion of a discharge flow rate to a consumption flow rate.

Here, the height Hin of the input notches 62a and the height Hdr of the drain notches 64a as stated before are designed so that Formula (1) given below may hold. FIG. 4 shows the relationship between the proportion Hin/(Hin+Hdr) of the height Hin of the input notches 62a to the sum of the height Hin of the input notches 62a and the height Hdr of the drain notches 64a and the discharge efficiency α being the proportion of a discharge flow rate to a consumption flow rate. Here, the "consumption flow rate" indicates the flow rate of the working oil which is consumed (exhausted) without being discharged from the output port 54, in the flow rate of the working oil inputted into the input port 52, in a steady state (a state where the supply of the oil pressure to the clutch CL is maintained), and the "discharge flow rate" indicates the flow rate of the working oil which is discharged from the output port 54, in the flow rate of the working oil inputted into the input port 52, in a transient state (a state where the supply of the oil pressure to the clutch CL is being started). In appropriately performing the above operation of the solenoid valve 20 of the embodiment, the height of the sum between the height Hin of the input notches 62a and the height Hdr of the drain notches 64a are subject to restrictions ascribable to the specifications of the sleeve 42 and the spool 44 and cannot be set at will. It is understood, however, that the proportion Hin/(Hin+Hdr) is set so as to make the discharge efficiency α as large as possible, whereupon the height Hin of the input notches 62a and the height Hdr of the drain notches 64a are set so as to attain this proportion Hin/(Hin+Hdr), whereby the consumption flow rate can be decreased, and the discharge flow rate can be increased. Accordingly, the oil pressure is permitted to rapidly act on the clutch CL, without enlarging power (energy) for driving the oil pump. In the embodiment, it has been verified that, when the height Hin of the input notches 62a and the height Hdr of the drain notches 64a are set with the proportion Hin/(Hin+Hdr) being a value of 0.72, the responsiveness of the clutch CL is enhanced 14% or more than in a related-art product. As shown in the figure, the discharge efficiency α becomes larger as the proportion Hin/(Hin+Hdr) comes near to a value of 1.0, so that a value of at least 0.85 is desirable when a dispersion ascribable to a manufacturing tolerance is taken into consideration.

$$0.72 \leq Hin/(Hin+Hdr) < 1.0 \tag{1}$$

In accordance with the solenoid valve 20 of the embodiment thus far described, the land 62 located near the input port 52 is formed with the input notches 62a in its end edge on the side of the communication portion 68, while the land 64 located near the drain port 56 is formed with the drain notches 64a in its end edge on the side of the communication portion 68, and the height Hin of the input notches 62a and the height Hdr of the drain notches 64a are set so that the proportion Hin/(Hin+Hdr) may fall within the range of at least 0.72 (preferably, at least 0.85) and less than 1.0, so that the consumption flow rate can be decreased, and the discharge flow rate can be enlarged. As a result, the oil pressure can be caused to rapidly act on the clutch CL, and the responsiveness of the clutch CL can be enhanced, without enlarging the power (energy) for driving the oil pump.

Figure 5:
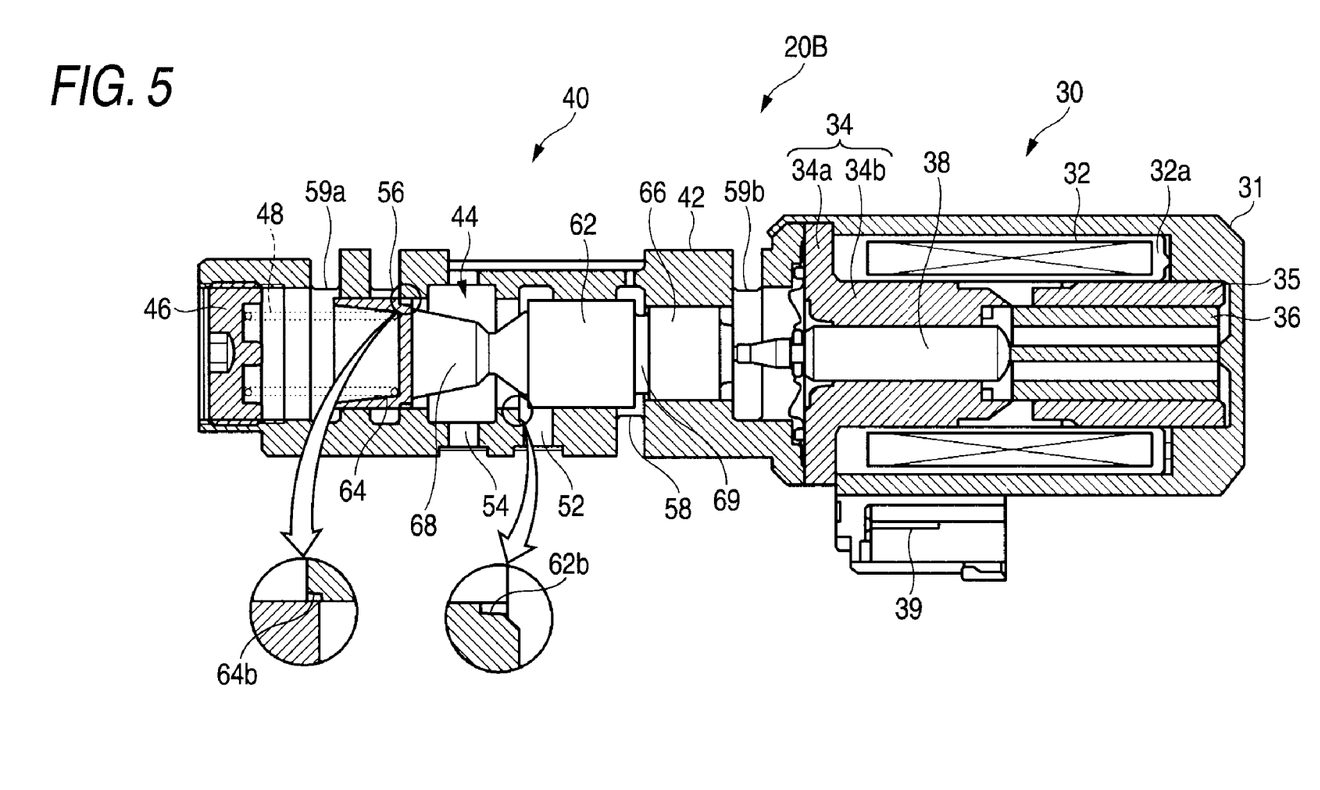
FIG. 5 is a configurational view showing the outline of the configuration of a solenoid valve 20B in a modified embodiment.

In the solenoid valve 20 of the embodiment, the land 62 of the spool 44 is formed with the input notches 62a, and the land 64 thereof is formed with the drain notches 64a. However, the invention is not restricted to the notches formed in the spool 44, but it may well form input notches and also drain notches in the sleeve 42. An example of a solenoid valve 20B in a modified embodiment in this case is shown in FIG. 5. In the solenoid valve 20B of the modified embodiment, as shown in the figure, an input notch 62b is formed in the inner edge of that part of the sleeve 42 which is formed with an input port 52, and a drain notch 64b is formed in the inner edge of that part thereof which is formed with a drain port 56. Besides, apart from the configuration in which the input notch 62b and the drain notch 64b as stated above are formed in the sleeve 42, it is also allowed that an input notch is formed in the land of a spool, while a drain notch is formed in a sleeve, and that an input notch is formed in a sleeve, while a drain notch is formed in the land of a spool.

In the solenoid valve 20 of the embodiment, the two input notches 62a and the two drain notches 64a are formed at the angular intervals of 180 degrees about the axis, but one input notch and one drain notch may well be formed, and three or more input notches and three or more drain notches may well be formed. However, it is desirable for stabilizing the operation of the spool 44 that two or more input notches and two or more drain notches are formed at equal angular intervals.

Figure 6:
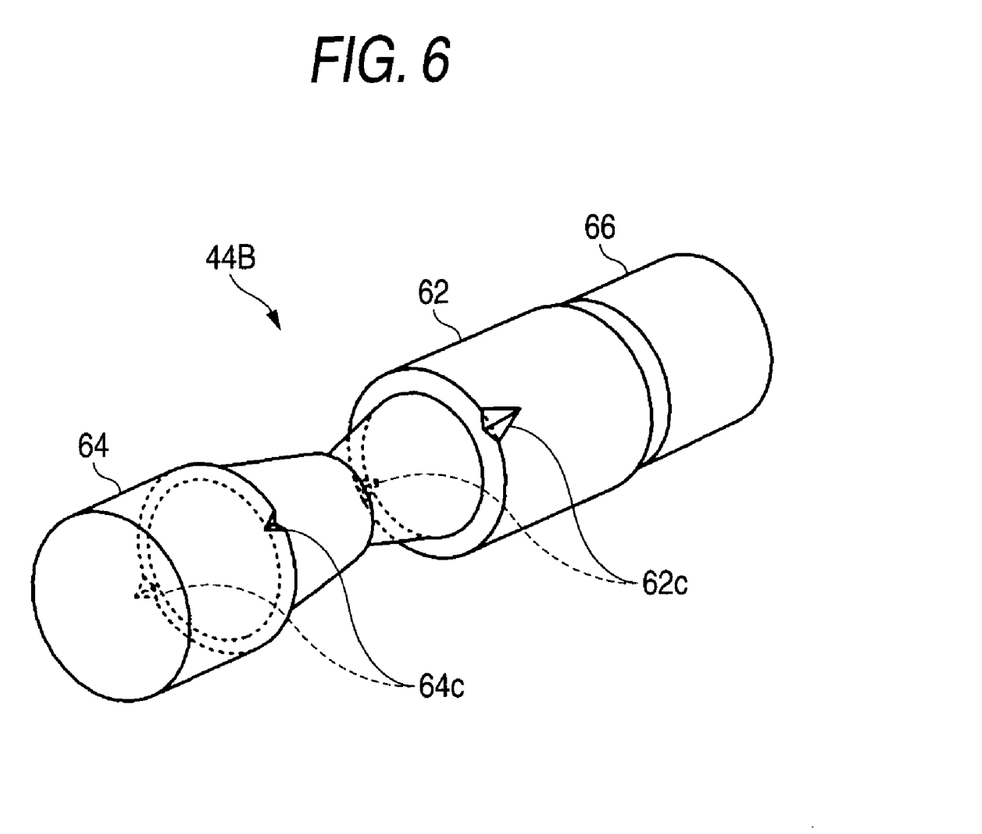
FIG. 6 is an exterior perspective view showing the exterior appearance of a spool 44B in a modified embodiment.

In the solenoid valve 20 of the embodiment, the shape of the input notches 62a and the drain notches 64a is formed to be arcuate, but the invention is not restricted to the arcuate shape. As shown by a spool 44B exemplified in FIG. 6, input notches 62c and drain notches 64c may well be formed in a V-shape by way of example. In this case, the pressure fluctuation of the working oil becomes still smaller than in the configuration in which the input notches and the drain notches are formed in the arcuate shape. Besides, apart from the configuration in which such input notches and drain notches are brought into the identical shape, input notches and drain notches may well be formed in different shapes in such a manner that the former is formed in the arcuate shape, whereas the latter is formed in the V-shape.

Figure 7:
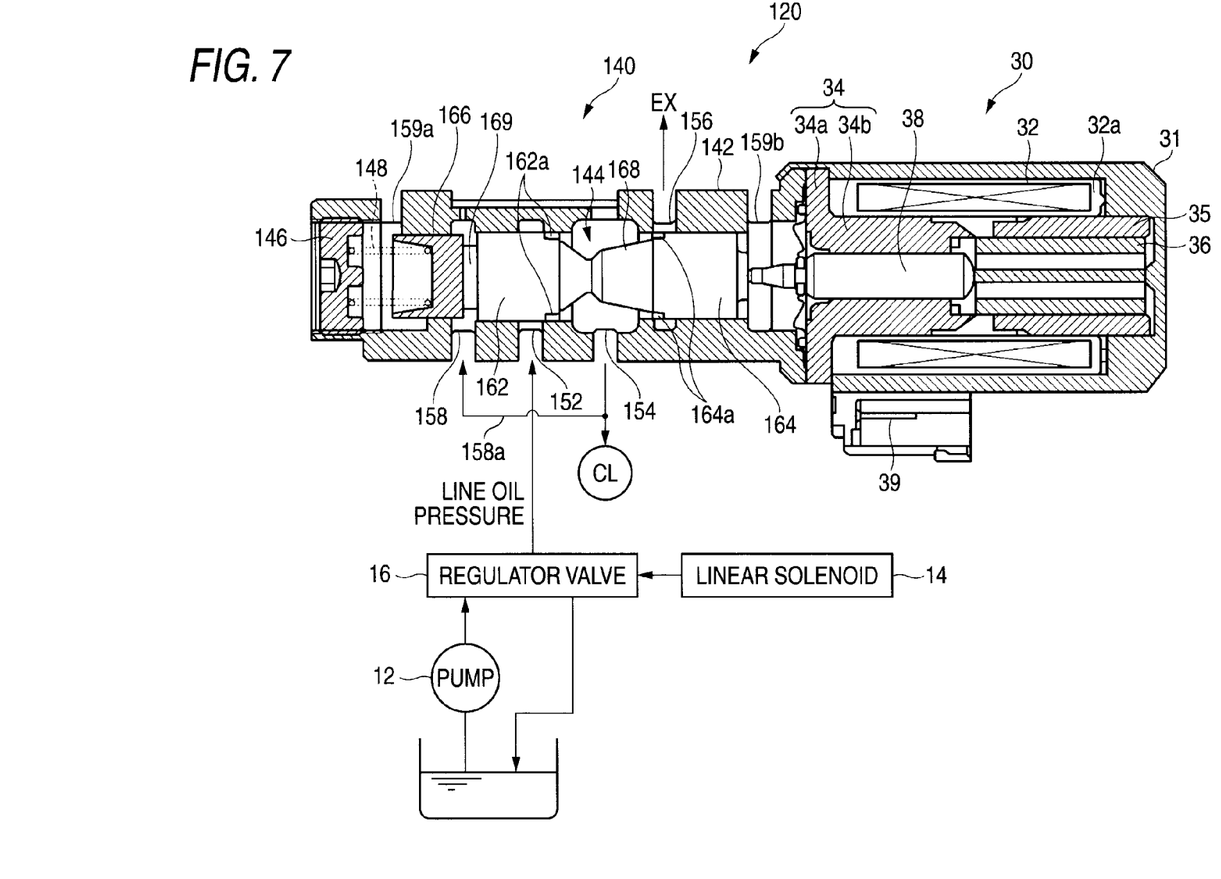
FIG. 7 is a configurational view showing the outline of the configuration of a solenoid valve 120 in a modified embodiment.

The solenoid valve 20 of the embodiment is configured as the linear solenoid valve of the normally-open type in which the input port 52 and the output port 54 are held in communication when the coil 32 is not energized, but a solenoid valve may well be configured as a linear solenoid valve of normally-closed type in which an input port is closed when a coil is not energized. FIG. 7 shows the outline of the configuration of a solenoid valve 120 in a modified embodiment. By the way, in the various constituents of the solenoid valve 120 of the modified embodiment, constituents identical to those of the solenoid valve 20 of the embodiment are assigned identical numerals and signs, and they shall be omitted from description. As shown in the figure, a sleeve 142 is formed as the openings of the internal space thereof with an input port 152 which is formed at substantially the central position of the sleeve 142 in the figure and into which a working oil pressure-fed from an oil pump 12 is inputted, an output port 154 which is formed at a somewhat right position in the figure and from which the working oil is discharged onto the side of a clutch CL, a drain port 156 which is formed at the position of a right end in the figure and from which the working oil is drained, and a feedback port 158 which is formed at a somewhat left position in the figure and into which the working oil discharged from the output port 154 is inputted through an oil passage 158*a* formed outside, so as to feed back the spool 144. Besides, the spool 144 includes three cylindrical lands 162, 164 and 166 each of which has an outside diameter being substantially equal to the inside diameter of the sleeve 142, a communication portion 168 which connects the middle land 162 and right land 164 in the figure, which is formed in a tapered shape having an outside diameter that is smaller than the outside diameters of the lands 162 and 164 and that becomes smaller toward the middle part thereof from the two lands 162 and 164 and which is capable of the communications among the individual ports of the input port 152, output port 154 and drain port 156, and a connection portion 169 which connects the middle land 162 and left land 166 in the figure and which serves to feed back the spool 144. Besides, in the spool 144, the land 162 located near the input port 152 is formed with arcuate input notches 162*a* in its end edge on the side of the communication portion 168 in such a manner that these notches have an angular interval of 180 degrees about the axis of the spool 144, and that the axial height of the input notches 162*a* from the end face of the land 162 becomes "Hin", while the land 164 located near the drain port 156 is formed with arcuate drain notches 164*a* in its end edge on the side of the communication portion 168 in such a manner that these notches similarly have an angular interval of 180 degrees about the axis of the spool 144, and that the axial height of the drain notches 164*a* from the end face of the land 164 becomes "Hdr". As explained before, the input notch height Hin and the drain notch height Hdr are formed so as to satisfy Formula (1). In the solenoid valve 120 of the modified embodiment thus configured, in a case where a coil 32 is not energized, the spool 144 is moved onto the side of the a solenoid portion 30 by the urging force of a coiled spring 148 (the state of FIG. 7), the input port 152 is closed by the land 162, and the output port 154 and the drain port 156 are communicated by the communication portion 168. Accordingly, an oil pressure acting on the clutch CL lowers. On the other hand, when the coil 32 is energized, a plunger 36 is attracted to a first core 34 by an attractive force which corresponds to the magnitude of a current applied to the coil 32, and consequently, a shaft 38 with the spool 144 connected to its distal end is pushed out frontward (leftward in FIG. 7), whereby the spool 144 is moved onto the side of the coiled spring 148. On this occasion, the spool 144 is stopped at a position at which the thrust (attractive force) of the plunger 36, the urging force of the coiled spring 148, and a feedback force exerted on the spool 144 by the pressure of the working oil inputted from the output port 154 into the feedback port 158 are just balanced. As the spool 144 is moved more onto the side of the coiled spring 148, the open area of the input port 152 is made larger, and the open area of the drain port 156 is made smaller, and when the spool 144 has been moved most onto the side of the coiled spring 148, the input port 152 and the output port 154 are completely communicated. Accordingly, the oil pressure acting on the clutch CL rises. In this manner, the solenoid valve 120 of the modified embodiment closes the input port 152 when the coil 32 is not energized, and it is therefore understood that the solenoid valve 120 functions as a solenoid valve of normally-closed type.

The solenoid valve 20 of the embodiment has been employed for the oil pressure control of the clutch CL incorporated in the automatic transmission, but it may well be employed for the oil pressure control of any working mechanism which is operated by an oil pressure.

Although exemplary embodiments of the present invention have been described above, the present invention is not restricted to such embodiments, but it is a matter of course that the present invention can be performed in various aspects within a scope not departing from the purport thereof.

The present invention is applicable in the manufacturing industries of solenoid valves.

What is claimed is:

1. A solenoid valve comprising:
a sleeve which has an internal space that is formed with an input port, an output port and a drain port,
a spool which is an axial member that is inserted in the internal space and which provides communications and cut-offs among the individual ports, due to axial movement of said spool, and
a solenoid portion which axially moves said spool;
wherein an input notch is formed in one of said sleeve and said spool so that a working oil flows into the input port through the notch, while a drain notch is formed in one of said sleeve and said spool so that the working oil is drained from the drain port through the notch; and
the input notch and the drain notch are formed so as to satisfy $0.72 \leq Hin/(Hin+Hdr) < 1.0$ where Hin denotes an axial length of the input notch, and Hdr denotes an axial length of the drain notch.

2. A solenoid valve as defined in claim 1, wherein the input notch and the drain notch are formed so as to satisfy $0.85 \leq Hin/(Hin+Hdr) < 1.0$.

3. A solenoid valve as defined in claim 1, wherein the solenoid valve is a valve to which a line pressure regulated by a regulator valve is inputted through the input port, and the solenoid valve regulates the inputted line pressure, and directly outputs an oil pressure through the output port to a clutch or a brake incorporated in an automatic transmission operated by being supplied with the oil pressure.

4. A solenoid valve as defined in claim 1, wherein at least one of the input notch and the drain notch are formed in an arcuate shape.

5. A solenoid valve as defined in claim 1, wherein at least one of the input notch and the drain notch are formed in a V-shape.

6. A solenoid valve as defined in claim 2, wherein the solenoid valve is a valve to which a line pressure regulated by a regulator valve is inputted through the input port, which regulates the inputted line pressure, and which directly outputs an oil pressure through the output port to a clutch or a brake incorporated in an automatic transmission operated by being supplied with the oil pressure.

7. A solenoid valve as defined in claim 2, wherein at least one of the input notch and the drain notch are formed in an arcuate shape.

8. A solenoid valve as defined in claim 2, wherein at least one of the input notch and the drain notch are formed in a V-shape.

9. A solenoid valve as defined in claim 3, wherein at least one of the input notch and the drain notch are formed in an arcuate shape.

10. A solenoid valve as defined in claim 3, wherein at least one of the input notch and the drain notch are formed in a V-shape.

11. A solenoid valve as defined in claim 6, wherein at least one of the input notch and the drain notch are formed in an arcuate shape.

12. A solenoid valve as defined in claim 6, wherein at least one of the input notch and the drain notch are formed in a V-shape.

* * * * *